United States Patent [19]

Turnbull

[11] 4,066,938
[45] Jan. 3, 1978

[54] INPUT CURRENT MODULATION TO REDUCE TORQUE PULSATIONS IN CONTROLLED CURRENT INVERTER DRIVES

[75] Inventor: Fred G. Turnbull, Scotia, N.Y.

[73] Assignee: General Electric Company, Schenectady, N.Y.

[21] Appl. No.: 730,145

[22] Filed: Oct. 6, 1976

[51] Int. Cl.² .............................................. H02P 5/40
[52] U.S. Cl. ...................................... 318/227; 363/40
[58] Field of Search .................... 318/227, 230, 231; 321/9 R, 10, 4, 5, 6, 7

[56] References Cited

U.S. PATENT DOCUMENTS

| | | | |
|---|---|---|---|
| 3,919,609 | 11/1975 | Klautschek et al. | 318/227 |
| 3,967,173 | 6/1976 | Stich | 318/227 |

Primary Examiner—Herman J. Hohauser
Attorney, Agent, or Firm—Donald R. Campbell; Joseph T. Cohen; Jerome C. Squillaro

[57] ABSTRACT

A controlled current motor drive system and method for its operation utilizes an open loop technique and simple control circuit additions to modulate the inverter input current at six times motor frequency and reduce sixth harmonic torque pulsations. Conventionally generated current source inverter control signals at six times motor frequency are also used to derive a sixth harmonic ac signal which is fed to the controlled rectifier gating circuit as an additional input.

6 Claims, 3 Drawing Figures

INPUT CURRENT MODULATION TO REDUCE TORQUE PULSATIONS IN CONTROLLED CURRENT INVERTER DRIVES

BACKGROUND OF THE INVENTION

This invention relates to a motor control system with a current source power converter, and more particularly to a method and open loop control circuit for modulating the input current to a controlled current inverter to reduce the harmonic current content and torque pulsations associated with these drive systems.

Adjustable speed ac motor drives using the current source inverter approach are operative to supply rectangular or flat-topped currents to the stator windings of the motor being energized. Assuming that the current source or controlled current inverter is a three-phase full wave bridge type inverter, torque pulsations at the sixth harmonic of the motor frequency caused by the non-sinusoidal current waveform can occur. The sixth harmonic torque pulsations result from interaction of the fifth and seventh current harmonics with the fundamental frequency, and are especially troublesome at very low motor speeds. During starting or when passing through zero speed to reverse the direction of rotation, the torque pulsations result in instabilities and uneven running.

A closed loop technique for reducing torque ripple which requires the continuous calculation of torque from sensed motor parameters is disclosed in U.S. Pat. No. 3,919,609 to Klautschek et al. The sensed torque is compared to a reference value and the difference used to modulate the input current. Also, there are various prior art techniques such as pulse width modulation that could be considered to reduce the harmonic content of the output current waveform. However, pulse width modulation approaches require higher cost main SCR's and a more complex control. The present invention is directed to an input current modulation technique which requires no additional power components and only a small addition to the control circuit, does not require measurement of actual torque, and is most effective at very low motor speeds where it is most required.

SUMMARY OF THE INVENTION

A controlled current motor drive system, of a type currently known, is comprised by a phase controlled rectifier or other voltage converter which is coupled by a dc reactor to a polyphase current source bridge inverter and controlled to produce variable amplitude and frequency output current. First control means operates the rectifier to produce variable output voltage and thereby determine the magnitude of the input current fed to the inverter. Second control means determines the operating frequency of the inverter and therefore the motor frequency, and includes means for deriving a desired motor frequency signal and also means for generating an inverter gating circuit signal having a frequency equal to six times the motor frequency.

To reduce sixth harmonic torque pulsations by an open loop technique requiring only a simple modification of the control circuit, a torque pulsation reduction control is added for utilizing the inverter gating circuit signal to derive a sixth harmonic modulating signal which is used as another input to the rectifier control circuit. The other input is an input current error signal. The result is that the rectifier output voltage and therefore the inverter input current and output current are modulated at six times the motor frequency, with the magnitude of the modulation set by a gain adjustment to minimize the fifth and seventh harmonic current content. In the preferred embodiment the inverter gating circuit signal is a pulse train, and a pulse to sine wave signal circuit actuated by the pulse train generates a sixth harmonic sine wave signal which is used to modulate the firing angles of the rectifier gating signals. A method of operation of the drive system is based on the foregoing. The maximum modulation frequency to which the phase controlled rectifier will respond is limited, and accordingly input current modulation is effective only at very low motor frequencies where it is most needed. This technique is particularly suitable for small industrial drives.

DESCRIPTION OF THE PREFERRED EMBODIMENT

Figure 1:
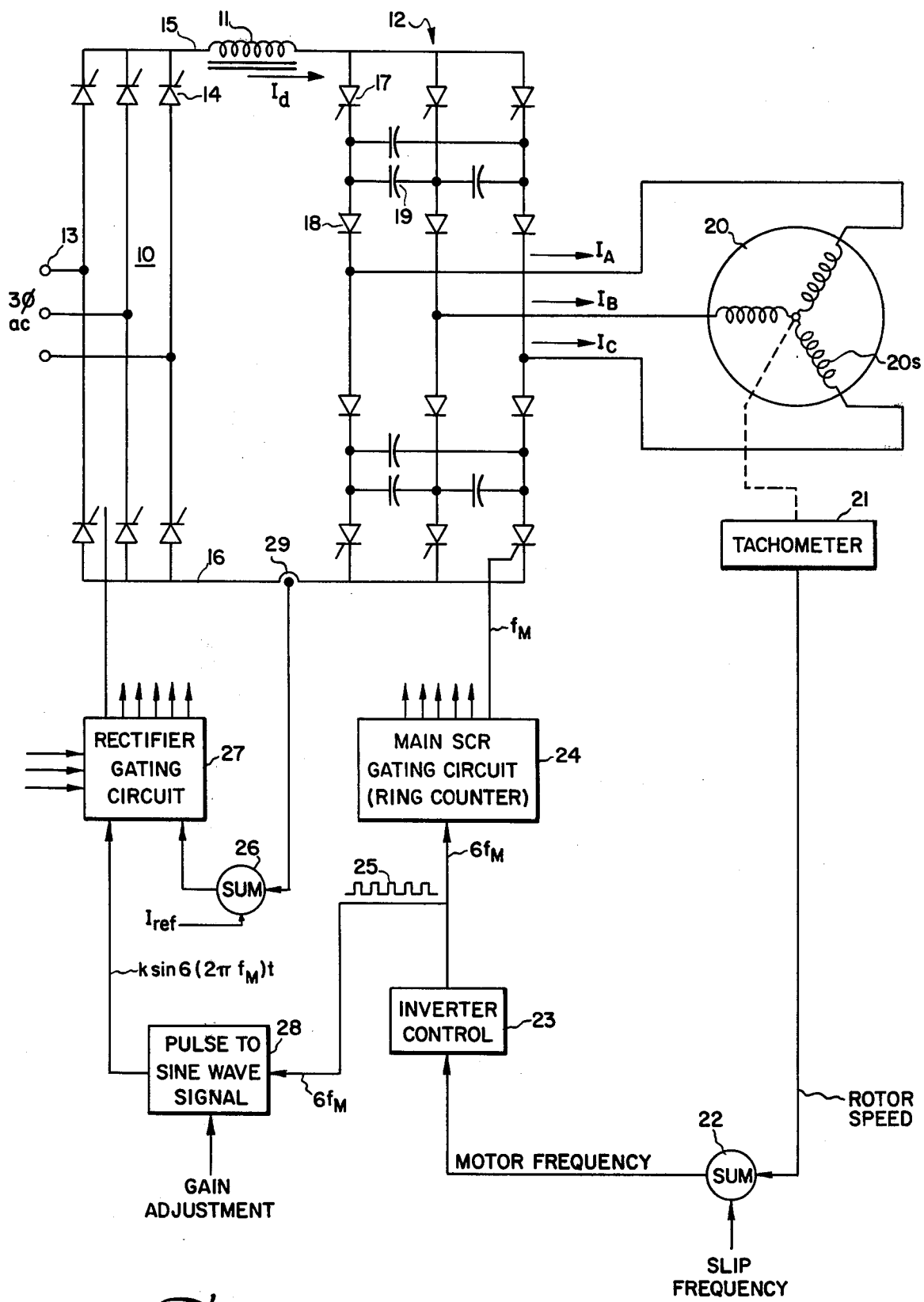
FIG. 1 is a schematic circuit diagram, with the control circuit in block diagram form, of a controlled current induction motor drive system with open loop inverter input current modulation at six times the motor frequency for smooth torque at low frequencies.

The small industrial current source inverter drive in FIG. 1 has the feature of open loop inverter input current modulation to reduce sixth harmonic torque pulsations at very low motor frequencies in the range of about 0–3 Hz. The motor runs smoothly upon start-up and when slowing down to reverse its direction of rotation. As compared to conventional controlled current motor drive systems, only a small addition to the control circuit is required to substantially eliminate sixth harmonic torque pulsations caused by the non-sinusoidal current waveform. In its preferred form, the motor drive system includes a full wave phase controlled rectifier 10 which is coupled through a direct-current reactor 11 to a cascaded autosequential commutated or series diode current source inverter 12. Instead of using a phase controlled rectifier, however, other types of voltage converters can be substituted such as a three-phase diode bridge rectifier followed by a chopper or, if the source is a battery, only the chopper. Other types of polyphase current source bridge inverters are also known, such as the third harmonic auxiliary commutated inverter with one commutating capacitor and the auxiliary impulse commutated inverter with three commutating capacitors. All of these current source inverters have six main thyristors that are fired sequentially.

Figure 2:
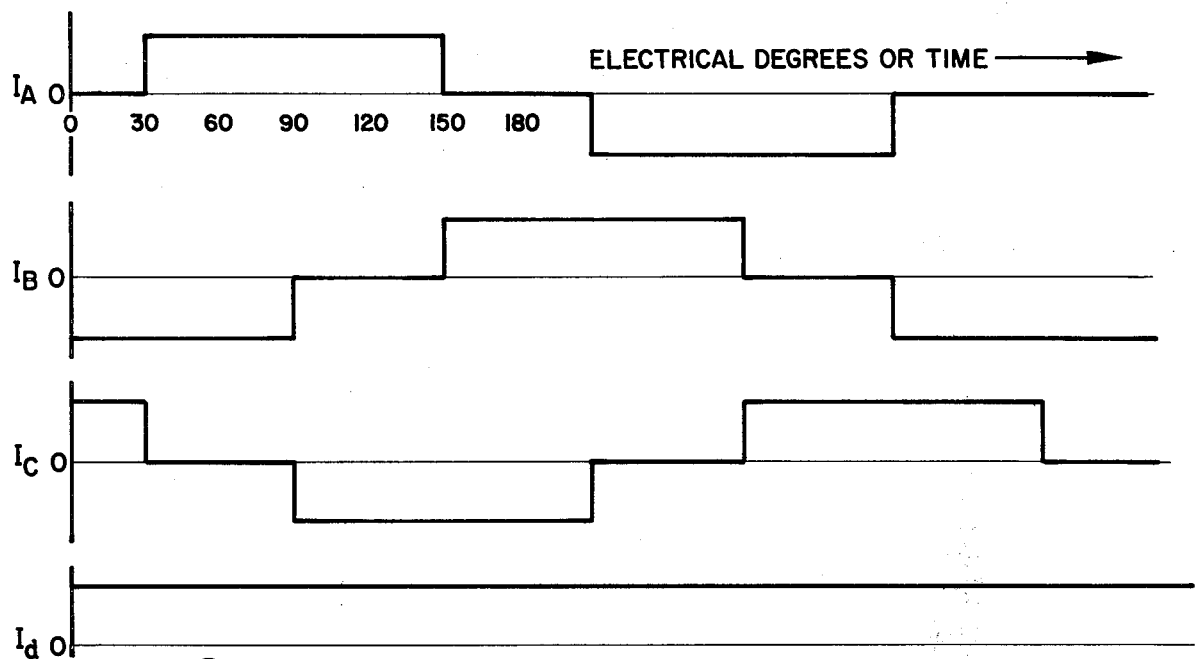
FIG. 2 shows prior art ideal inverter output and input current waveforms assuming the input current is constant.

In FIG. 1, input terminals 13 are energized by a commercially available 60 Hz, three-phase voltage source. SCR bridge rectifier 10 has six phase controlled SCR's 14 which are controlled to produce a variable output voltage between rectifier terminals 15 and 16. The magnitude of the output voltage applied to direct-current reactor 11 determines the level of input current $I_d$ fed to inverter 12. The dc reactor isolates the two power circuits, ac-dc and dc-ac. Briefly describing the autosequential commutated current source inverter, in each of the six inverter legs is a main SCR 17 and a series connected blocking diode 18, with three delta-connected commutating capacitors 19 provided between the intersections of each SCR and diode in the upper inverter section for producing positive polarity rectangular wave output currents. Similarly, a second bank of commutating capacitors is provided between the intersections of each SCR and diode in the lower inverter section for producing negative polarity rectangular wave output currents. As is known in the art, a conducting main SCR is turned off by means of the parallel capacitor commutation mechanism upon supplying a gating pulse to the next main SCR in sequence. The blocking diodes in series with the main SCR's serve to isolate the commutating capacitors from load 20, which is a three-phase induction motor or other polyphase motor. FIG. 2 illustrates conventional prior art output current waveforms, assuming that the input current $I_d$ is constant rather than being modulated at six times the motor frequency as herein taught. The output current in each phase ideally has a rectangular waveshape with a 120° duration in each half cycle, neglecting commutation. Since the per phase rectangular wave output currents are 120° displaced from one another, at any moment two stator windings 20s are conducting current while the remaining phase is open-circuited. For further information on operation of the auto-sequential commutated inverter, reference may be made to U.S. Pat. No. 3,908,941 to R. F. Griebel. Whereas adjusting the rectifier output voltage changes the magnitude of the inverter output current and thus the motor current, adjusting the operating frequency of inverter 12 changes the frequency of the inverter output current which in turn corresponds to the motor frequency.

Figure 3:
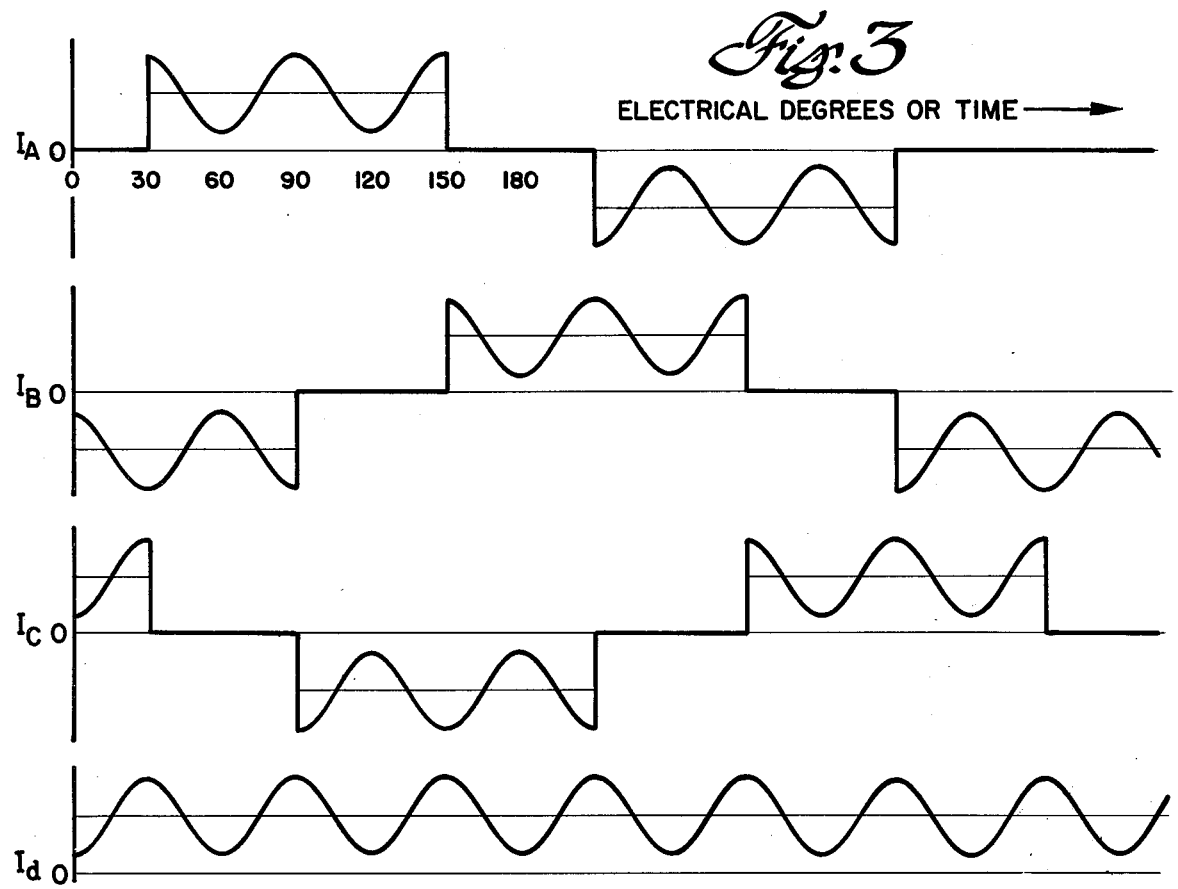
FIG. 3 shows the modulated current waveforms at the inverter output and input for the drive system of FIG. 1.

Since the motor current in prior art FIG. 2 is a 120° square or rectangular wave, because of the phase-to-phase commutation, the fifth and seventh harmonics of the motor frequency are present in the motor current in addition to the fundamental motor frequency. The third, ninth, and fifteenth harmonics are eliminated by the inverter configuration, and although other higher order harmonics above the fifth and seventh are present, they do not present as much of a problem because of their small magnitudes. The reverse phase sequence fifth harmonic and the forward phase sequence seventh harmonic interact with the fundamental to produce a sixth harmonic torque component in the motor's developed torque. As was mentioned, the torque pulsations are objectionable at very low frequencies because it is at these low frequencies that the motor can respond to the harmonics in the motor current. By modulating the rectifier output voltage and inverter input current at six times the motor frequency as herein described, the sixth harmonic pulsations are substantially eliminated. There is no compensation for twelfth harmonic torque pulsations resulting from the interaction of the eleventh and thirteenth harmonics with the fundamental frequency, however twelfth harmonic torque pulsations are relatively minor and need not be considered in a small industrial drive in the interests of retaining a relatively simple control circuit. The three-phase inverter output current waveforms in FIG. 3 show the addition of the sixth harmonic current component to the dc level required by the load. The magnitude of the sixth harmonic signal is set in an open-loop manner at the correct value to reduce the fifth and seventh harmonic currents or the sixth harmonic torque pulsations. This is achieved by a small addition to the control circuit that would otherwise be required to produce the conventional motor current waveforms in FIG. 2.

Various control strategies have been suggested for generating variable amplitude and frequency output current in a controlled current induction motor drive system, and can be used in the practice of the invention. The preferred control circuit or control means in FIG. 1 for independently setting the slip frequency and dc link current, $I_d$, is suitable for a small industrial drive and illustrates the principles of such closed feedback loop control strategies. In the first feedback control loop for setting the slip frequency, a tachometer 21 or other motor shaft speed sensor generates a signal indicative of the actual rotor speed and rotor electrical frequency. To constrain the stator frequency or motor excitation electrical frequency to be the sum of the slip and rotor frequency, the sensed rotor frequency signal and a preset slip frequency signal are applied to a summing circuit 22 to derive a desired motor excitation frequency signal. Inverter control circuit 23, which can be a voltage controlled oscillator, converts the desired motor frequency signal to an inverter gating circuit signal having a frequency equal to six times the motor frequency, i.e., $6f_M$. The six times motor frequency inverter gating circuit signal in turn is fed to the main SCR gating circuit 24 which sequentially generates power gating pulses for the six main SCR's in current source inverter 12. The output of inverter control 23 is preferably a pulse train 25 and gating circuit 24 is a ring counter effective to change the sixth harmonic of the desired motor frequency to polyphase signals at the fundamental. Consequently, the operating frequency of current source inverter 12 adjusts to the desired motor frequency.

In the other feedback control loop for controlling the magnitude of the dc link current $I_d$ fed to current source inverter 12, a current sensor 29 continuously generates a signal indicative of the instantaneous dc link current or inverter input current $I_d$ which is fed to another summing circuit 26. The input current error signal representing the difference between a command value of current, $I_{ref}$, and the value of actual sensed current in turn is supplied as one input to a rectifier gating circuit 27. Gating circuit 27 is also supplied with the three-phase input voltage and frequency, and operates in conventional fashion to adjust the firing angles of rectifier phase controlled SCR's 14 to generate the magnitude of rectifier output voltage corresponding to the preset input current level. These two control circuit loops, without modification to include a torque pulsation reduction control circuit, operate the drive system to generate the conventional unmodulated output current waveform in FIG. 2.

To modulate the inverter input current at six times the motor frequency, in synchronism with the changing motor frequency, a torque pulsation reduction control is added to the control circuit as just described for utilizing the six times motor frequency gating circuit signal to derive a sixth harmonic modulating signal which is used as an additional input to rectifier gating circuit 27. In its preferred form, pulse train 25 having a frequency equal to six times the motor frequency is applied to a pulse to sine wave signal circuit 28, which produces at its output a sixth harmonic sine wave signal $k\sin6(2\pi f_M)t$. That is, the output of component 28 is a sine wave signal having the same frequency as the input pulse train 25. Circuit 28 has a gain adjustment for empirically setting the magnitude of the sixth harmonic sine wave in open-loop manner at the correct value to reduce fifth and seventh harmonic currents. In rectifier gating circuit 27, the input current error signal and the sixth harmonic sine wave signal are effective in combination to modulate the firing angles of phase controlled SCR's 14 at six times motor frequency. Thus, the rectifier output voltage and the inverter input current are modulated at six times motor frequency (see FIG. 3) to reduce sixth harmonic pulsations. The three-phase output current waveform in FIG. 3 shows the sixth harmonic added to the dc level and alternately switched by the inverter.

The maximum modulation frequency (sixth harmonic motor frequency) to which the phase controlled rectifier can respond is limited by the input frequency, number of phases, and phase controlled rectifier configuration. With the circuit shown, assuming a 60 Hz input, modulation is possible up to approximately 18 Hz. This is suitable for motor frequencies from 0 to 3 Hz. It is at these very low motor frequencies where torque pulsation reduction is most required. At higher frequencies the torque pulsation reduction control can be disabled or, if retained, continues to operate but is ineffective to modulate the input current.

In the event that phase controlled rectifier 10 is replaced by a diode bridge rectifier followed by a chopper, or a chopper is used with a battery source, the input current error signal in known manner controls switching of the active chopper device to establish the dc level of current required by the load. The effect of sixth harmonic modulating signal $k\sin6(2\pi f_M)t$ is to modulate switching of the active chopper device to add a sixth harmonic current to the dc level. Except for this modification, operation of the controlled current induction motor drive system is the same. The several components given in block diagram form in FIG. 1 are conventional or utilize conventional techniques and need not be further explained. For further information, reference may be made to *The SCR Manual*, Fifth Edition, published by the General Electric Company, Copyright 1972.

While the invention has been particularly shown and described with reference to a preferred embodiment thereof, it will be understood by those skilled in the art that the foregoing and other changes in form and details may be made therein without departing from the spirit and scope of the invention.

The invention claimed is:

1. A controlled current motor drive system comprising
   a voltage converter and a polyphase current source bridge inverter connected in cascade with a direct current reactor therebetween for producing variable amplitude and frequency output current to be supplied to a motor,
   first control means for operating said voltage converter to produce variable output voltage and thereby determine the magnitude of the undirectional input current fed to said inverter, and second control means for determining the operating frequency of said inverter and therefore the motor frequency,
   said second control means including means for deriving a desired motor frequency signal and means for generating an inverter gating circuit signal having a frequency equal to six times the motor frequency, and
   torque pulsation reduction control means for utilizing said inverter gating circuit signal to derive a sixth harmonic modulating signal which is used as an additional input to said first control means to selectively modulate the voltage converter output voltage and therefore the inverter input current at six times the motor frequency.

2. The drive system according to claim 1 wherein said torque pulsation reduction control means further includes means for empirically adjusting the magnitude of said sixth harmonic modulating signal and thus the inverter input current modulation.

3. The drive system according to claim 2 wherein said inverter gating circuit signal is a pulse train, and said torque pulsation reduction control means is comprised by a circuit actuated by the pulse train for generating a sine wave signal with a frequency six times the motor frequency.

4. The drive system according to claim 2 wherein said voltage converter is a phase controlled rectifier, and said first control means comprises a rectifier gating circuit which is controlled by the current error between sensed input current and reference input current levels, said rectifier gating circuit further being controlled by said sixth harmonic modulating signal.

5. The drive system according to claim 4 wherein said inverter gating circuit signal is a pulse train, and said torque pulsation reduction control means is comprised by a circuit actuated by the pulse train for generating a sine wave signal with a frequency six times the motor frequency.

6. In a controlled current motor drive system which comprises a voltage converter and a polyphase current source bridge inverter connected in cascade with a direct-current reactor therebetween for producing variable amplitude and frequency output current to be supplied to a motor, the method of operating said drive system to reduce torque pulsations comprising the steps of
   generating inverter control circuit signals at a frequency equal to six times a desired motor frequency which are used to adjust the operating frequency of said inverter and maintain a desired motor frequency,
   deriving from said inverter control circuit signals a sixth harmonic sine wave signal, and
   utilizing said sixth harmonic sine wave signal in combination with an inverter input current error signal to generate voltage converter control signals to maintain the voltage converter output voltage and inverter input current at a desired level with a modulation of six times the motor frequency.

* * * * *